United States Patent [19]
Daiber et al.

[11] Patent Number: 5,424,824
[45] Date of Patent: Jun. 13, 1995

[54] METHOD AND APPARATUS FOR NORMAL SHOCK SENSING WITHIN THE FOCAL REGION OF A LASER BEAM

[75] Inventors: Troy D. Daiber, Kent; David C. Soreide, Seattle, both of Wash.

[73] Assignee: The Boeing Company, Seattle, Wash.

[21] Appl. No.: 61,405

[22] Filed: May 12, 1993

[51] Int. Cl.⁶ .......................... G01P 3/36; F02C 9/00; F02B 27/00
[52] U.S. Cl. .................. 356/28.5; 60/39.24; 60/39.29; 137/15.2
[58] Field of Search .......................... 60/39.24, 39.29; 356/28.5; 137/15.2

[56] References Cited

U.S. PATENT DOCUMENTS

| | | | |
|---|---|---|---|
| 2,971,329 | 7/1959 | Barry | 60/35.6 |
| 2,971,330 | 7/1959 | Clark | 60/35.6 |
| 3,302,657 | 1/1965 | Bullock | 137/15.2 |
| 3,623,361 | 11/1971 | Funk | 73/147 |
| 3,642,017 | 2/1972 | Homes | 137/81.5 |
| 3,714,827 | 2/1973 | Batts | 73/147 |
| 3,911,260 | 10/1975 | Dustin | 235/151.34 |
| 3,966,324 | 6/1976 | Iten | 356/106 |
| 3,984,686 | 10/1976 | Fletcher | 250/339 |
| 4,148,585 | 4/1979 | Bargeron | 356/28.5 |
| 4,879,895 | 11/1989 | Sajben | 73/4 |
| 5,072,612 | 12/1991 | Iverson | 73/116 |
| 5,164,784 | 11/1992 | Waggoner | 356/28.5 |
| 5,164,823 | 11/1992 | Keeler | 358/95 |

OTHER PUBLICATIONS

Laser Velocimetry Applied To Transonic And Supersonic Aerodynamics by Johnson, Bachalo and Moddaress.
Application of Fourier Images To The Measurement Of Particle Velocities by Chan and Ballik, Appl. Optics, vol. 13, No. 2, Feb. 1974, p. 234.
The Application of A Laser Anemometer To The Investigation Of Shock-Wave by L. F. East, Agard Conf. Proc. #193, St. Louis, France, 3-5 May 1976.
Measurement of Shock Wave Parameters By An Optical Technique by Ashaev, Levin and Mironov, Sov. Tech. Phys. Lett., 6(8), Aug. 1980, p. 433.
Development of Photon Correlation Anemometry For Application To Supersonic Flows by J. B. Abbiss, Agard Conf. Proc., #193, St. Louis, 3-5 May 1976.
Retrieval Of Flow Statistics Derived From Laser Anemometry By Photon Correlation by Moore and Smart, J. Phys., vol. 9, No. 11, Nov. 1976, p. 977.

*Primary Examiner*—Stephen C. Buczinski

[57] ABSTRACT

A system using Lidar/Laser anemometry for measuring the position of the normal shock wave and air velocity in the inlet of a supersonic engine is described, A laser beam is focused over a region in the inlet where the shock is expected to be. Small particles in the inlet air each reflect the light which is Doppler shifted according to the air velocity in that point. The system and method utilizes the relative amplitude of two peaks in the Fourier transform of the optical return signal to determine if the position of the shock is within the focal region of the laser.

2 Claims, 3 Drawing Sheets

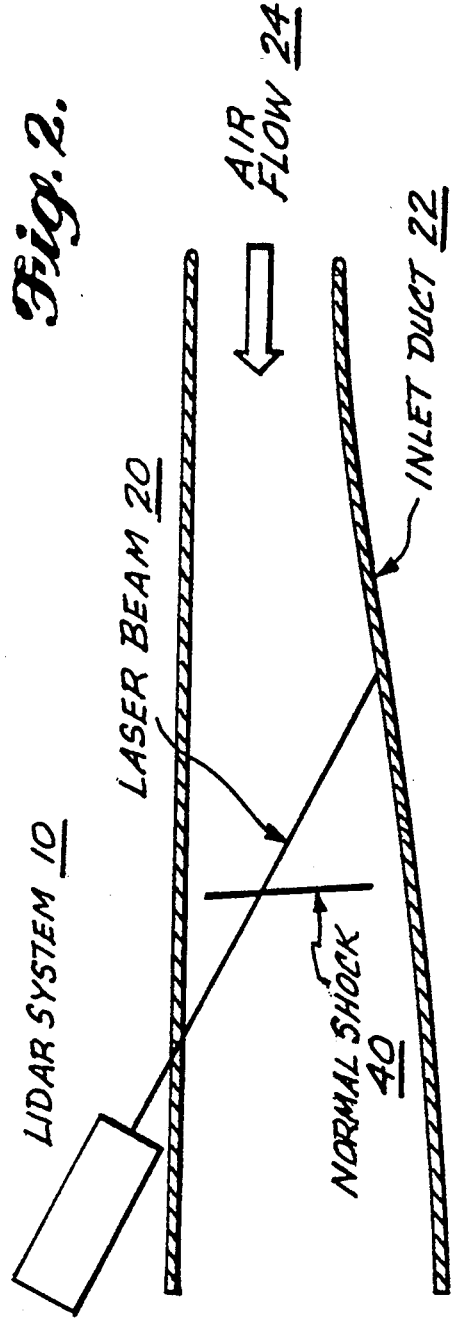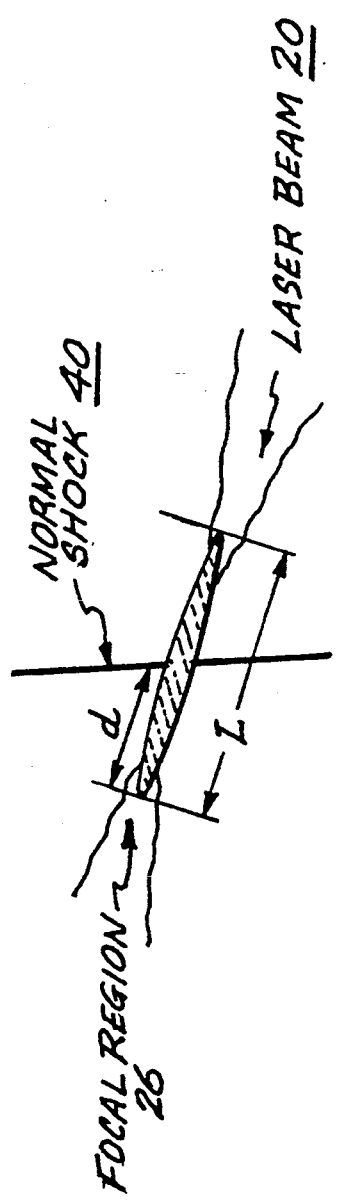

METHOD AND APPARATUS FOR NORMAL SHOCK SENSING WITHIN THE FOCAL REGION OF A LASER BEAM

FIELD OF THE INVENTION

The present invention relates to systems and methods for determining position of normal shock in supersonic flow, and more specifically to a Lidar system and method for determining the position.

BACKGROUND OF THE INVENTION

The problem of determining the position of the normal shock in the inlet of a supersonic jet engine is one which has received considerable attention. If the shock is uncontrolled, the engine can "unstart." The result is a loss of engine power. Several technologies have been used to sense the position of the shock. The oldest is a set of pressure taps on the side of the inlet which measure the change in pressure due to the shock and from the position of the pressure shift measure the shock position. This information is then used in a feedback loop to control the inlet configuration. The pressure signature is obscured both by the shock boundary layer interaction and by the fact that the shock is not planar. Other methods have been tried experimentally, including the construction of a shadowgraph to detect the shock location.

Lidar/Laser anemometry is a well-established method of sensing air flow velocities which can operate at a point or along a line it has the advantage that there is no physical probe at the point where the velocity is being made.

In the patent literature, U.S. Pat. No. 5,164,784 assigned to The Boeing Company is illustrative of a Lidar system and method used to measure relative air velocity as a function of a Doppler shift in the frequency of light reflected from aerosol particles in the fluid.

U.S. Pat. No. 5,072,612 assigned to The Boeing Company is illustrative of a system for determining the position of a normal shock in a supersonic inlet of an aircraft power plant by projecting a sheet of light across the inlet and observing the bending of a portion of the sheet by the shock.

In the literature, a conference paper titled "Laser Velocimetry Applied to Transonic and Supersonic Aerodynamics," by D.A. Johnson, et al., appears in *AGARD Conference Proceedings No.* 193 on "Applications of Non-Intrusive Instrumentation in Fluid Flow Research," 3-5, May 1976, at pages 3- to 3-2. The D.A. Johnson, et al., paper shows two laser beams projected into the flow and the difference in Doppler shift is sensed to compute velocity. The region of space over which flow velocity is measured is small, being nearly a point measurement. Velocity field, including the shock wave, is measured at a point in time, in contrast to the invention hereinafter described spanning the shock.

SUMMARY OF THE INVENTION

In accordance with this invention, apparatus is provided for utilizing the Doppler shifted light scattered from aerosol particles to measure the velocity distribution in the focal volume. From the relative amplitudes of the subsonic and supersonic signals, the position of the normal shock is determined.

BRIEF DESCRIPTION OF THE DRAWINGS

FIG. 2 is a schematic showing in more detail a FIG. 1 system installation utilized in accordance with a preferred embodiment of the present invention;

FIG. 2A is illustrative of the elongated focal region of the projected laser beam utilized in practicing the preferred embodiment of the present invention; and, FIG. 3 is a system block diagram of the present normal shock sensing system.

DETAILED DESCRIPTION OF THE PREFERRED EMBODIMENT

Figure 1:
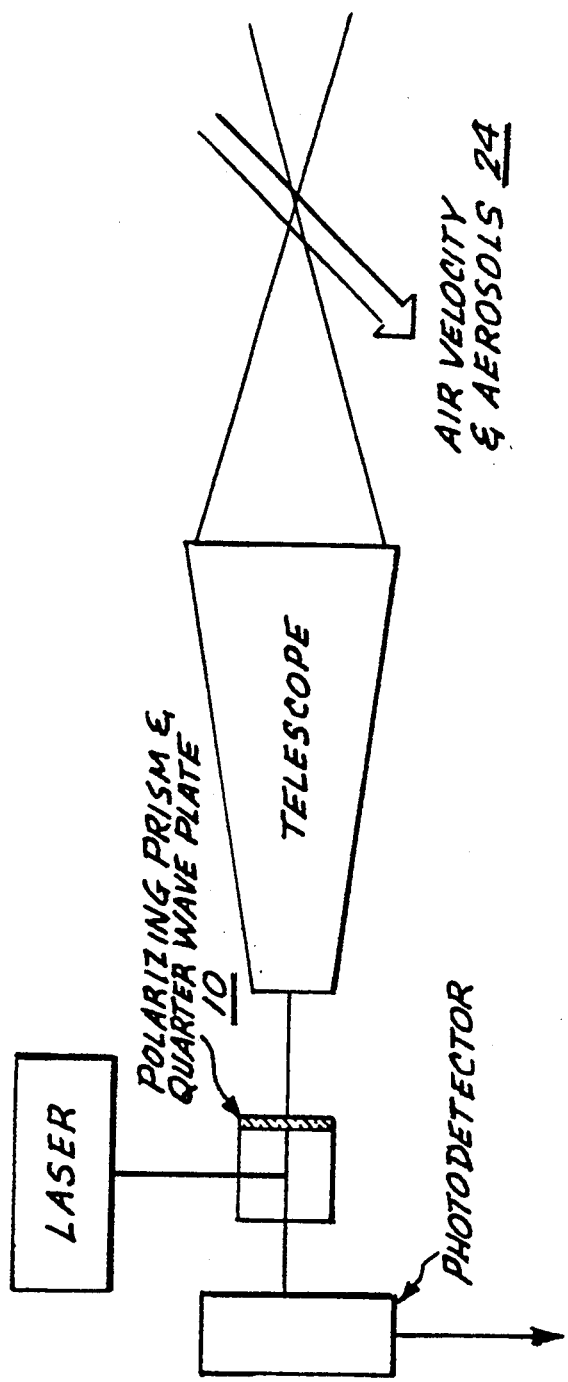
FIG. 1 is a Lidar optics block diagram showing a laser anemometer.

The present normal shock sensing system utilizes Lidar optics 10, as shown in FIG. 1, for projecting a laser beam 20, as seen in FIG. 2, into the inlet duct 22 of an air breathing supersonic engine having an air flow 24 containing aerosol particles.

Figure 3:
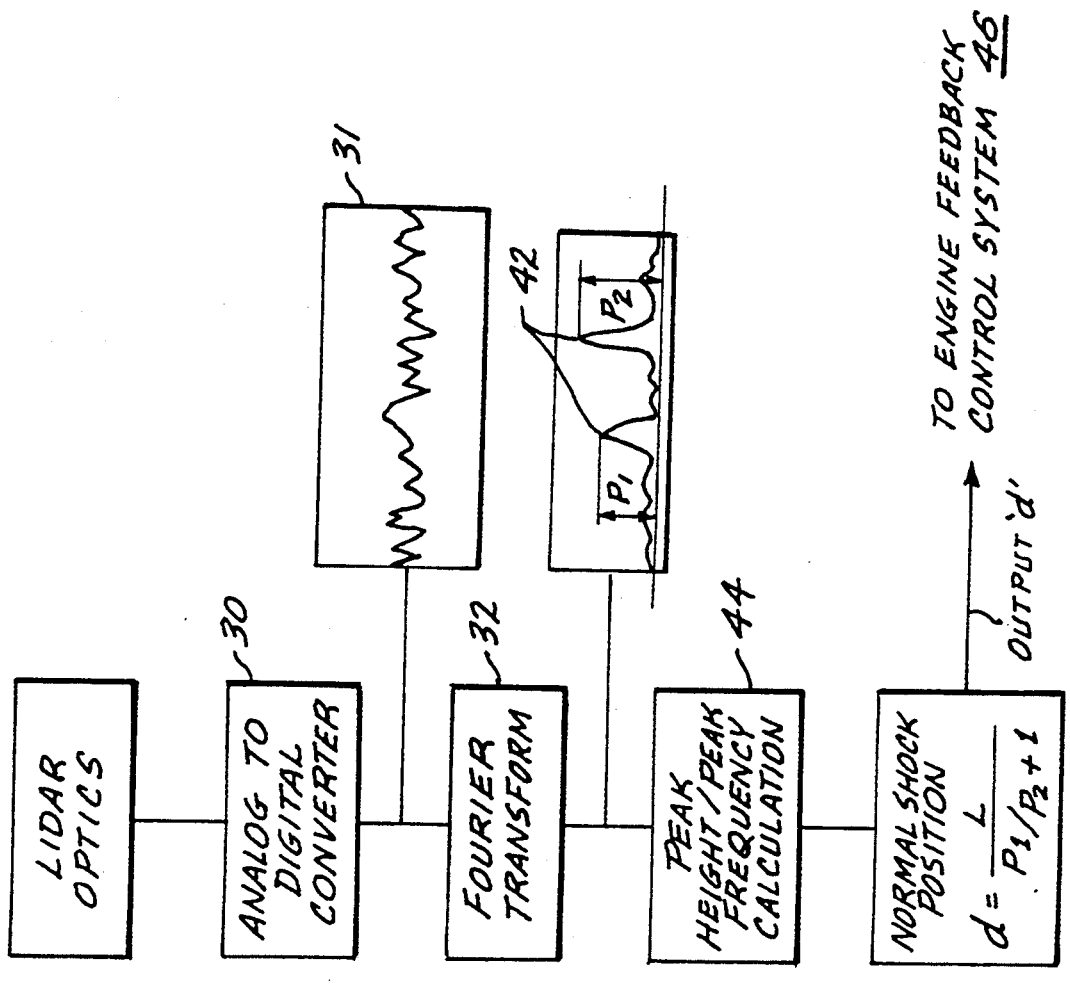

By controlling the f number of projected laser beam 20, the length L, as seen in FIG. 2A, of focal region 26 over which laser beam 20 is focused can be varied. The light is scattered all along elongated focal region 26 and the return signal 31 (seen in the system block diagram of FIG. 3) is an incoherent sum of all the scattered light. The frequency of the light scattered from each particle is Doppler shifted in frequency according to the velocity at that point. A Fourier transform 32 of return signal 31 will exhibit the spread of frequencies in the Doppler shifts, which implies a spread in velocities. If the region 26, as seen in FIG. 2A, over which the scattered light is collected includes the normal shock 40, then the Fourier transform will contain two separated peaks 42, one from upstream, the other from downstream of shock 40. The peak height/peak frequency calculation 44 determines the peak heights and frequencies of the two peaks 42 and uses the frequencies to discriminate between the upstream and downstream peaks. As shock 40 moves along laser beam 20, the relative heights of peaks 42 will vary, and will be a sensitive indicator of shock 40 position. By focusing laser beam 20 the length of the region over which the shock is measured can be controlled. When the shock is out of focal region 26, the peak height/peak frequency calculation 44 still reports a velocity, and from that velocity, it can be deduced whether shock 40 is upstream or downstream of focal region 26.

The relationship between $P_1$ and $P_2$ (42) is:

$$\frac{P_1}{P_2} = \frac{(L-d)}{d} ; d = \frac{L}{\frac{P_1}{P_2} + 1}$$

where:
 $P_1$=height of first peak (see FIG. 3) in the Fourier transform (lowest frequency), and
 $P_2$=height of second peak (see FIG. 3) in the Fourier transform;
 d=distance of shock 40 from the end of focal region 26; and,
 L=total length of focal region 26

The present system concept allows the detection of the position of normal shock 40 in supersonic inlet 22. This information is essential to controlling the inlet configuration and is coupled to engine feedback control system 46 to prevent engine unstart. Because the measurement is remote, the present system concept does not require the installation of hardware projecting into inlet 22 which would drastically disrupt the flow. A further benefit is that the absolute velocity of the flow in inlet 22 is measured both upstream and downstream of normal shock 40. An installation diagram is shown in FIG. 2.

What is claimed is:

1. A system for measuring a normal shock wave in a supersonic air flow comprising in combination:
   a Lidar optical system for providing a Lidar focal region having a length L adjustable by controlling the f number of a projected laser beam;
   means for providing a Fourier transformation of the return signal containing a first peak having a height $P_1$ from a subsonic flow and a second peak having a height $P_2$ from the supersonic flow encompassing L where:

$$\frac{P_1}{P_2} = \frac{(L-d)}{d} \text{ and } d = \frac{L}{\frac{P_1}{P_2} + 1}$$

d = the output of the system representative of distance of the normal shock from the end of the focal region, and L = total length of the focal region.

2. In the method of determining the position of a normal shock wave in the inlet of a supersonic engine, the steps of:
   adjusting a focal region of a laser beam to provide a length L containing the normal shock wave which separates a subsonic flow from the supersonic flow; and
   determining the relative amplitudes of said subsonic and said supersonic flows to determine the position d of the normal shock wave with respect to L.

* * * * *